United States Patent [19]
Nowak et al.

[11] Patent Number: 5,514,265
[45] Date of Patent: May 7, 1996

[54] AUTOMATIC SCREW MACHINE WITH SELF-CLEANING FILTER

[75] Inventors: Gary F. Nowak, Newington; Glen L. Nowak, New Britain, both of Conn.

[73] Assignee: Nowak Products, Inc., Newington, Conn.

[21] Appl. No.: 263,370

[22] Filed: Jun. 20, 1994

[51] Int. Cl.⁶ ............................ B01D 33/073; B01D 33/46
[52] U.S. Cl. ......................... 210/136; 210/168; 210/171; 210/396; 210/402
[58] Field of Search ................................. 210/168, 171, 210/172, 396, 402, 416.5, 136

[56] References Cited

U.S. PATENT DOCUMENTS

| | | | |
|---|---|---|---|
| 810,020 | 1/1906 | Applegate | 210/396 |
| 3,286,843 | 11/1966 | Kraissl, Jr. | 210/396 |
| 3,784,017 | 1/1974 | Arnold et al. | 210/396 |
| 4,028,247 | 6/1977 | Yessaian | 210/168 |
| 4,421,645 | 12/1983 | Creps et al. | 210/400 |
| 4,655,940 | 4/1987 | Harms | 210/168 |
| 4,992,167 | 2/1991 | Uchiyama | 210/171 |
| 5,167,839 | 12/1992 | Widmer,II et al. | 210/168 |

*Primary Examiner*—Christopher Upton
*Attorney, Agent, or Firm*—Ira S. Dorman

[57] ABSTRACT

A filter unit of an automatic screw machine employs a filter element that rotates relative to, and in contact with, a brush element. Foreign matter is thereby automatically dislodged and ejected from the filter element.

6 Claims, 3 Drawing Sheets

5,514,265

AUTOMATIC SCREW MACHINE WITH SELF-CLEANING FILTER

BACKGROUND OF THE INVENTION

Automatic screw machines normally include systems for the storage, delivery, filtration, and recovery of oil used for cooling and lubrication of the tooling. Any clogging of filters that occurs will of course tend to reduce liquid flow and, in the most serious cases, will ultimately result in blockage; the cleaning necessary to avoid such problems is inconvenient as well as time-consuming.

SUMMARY OF THE INVENTION

Accordingly, it is the broad object of the present invention to provide an automatic screw machine having an incorporated unit for filtering coolant liquid, wherein the filter unit includes means for automatically cleaning the filter element.

A more specific object of the invention is to provide such a machine in which relative movement of a cleaning element is effected for dislodging foreign matter from the filter element in a highly effective and efficient manner, the filter unit itself being of relatively incomplex and inexpensive construction and manufacture.

It has now been found that the foregoing and related objects of the invention are attained by the provision of an automatic screw machine comprised of means for mounting a plurality of tools at a machining location, drive means, an associated sump, a liquid delivery system including an intake conduit for conducting liquid from the sump to the machining location, and a filter unit including a filter element, a cleaning element, and support structure. The filter element has an internal chamber and an outside surface portion of circular configuration, and is mounted by the support structure for rotation about its axis in direct contact with the cleaning element, the external configuration of which is complementary to the outside surface portion of the filter element. The intake conduit is so connected as to enable withdrawal of liquid passing into the chamber of the filter element, which is in turn operatively associated with the sump for suffusion by liquid contained therein. Rotation of the filter element is effected through operative connection to the drive means, thereby automatically cleaning the filter element by rotation against the cleaning element.

In preferred embodiments the cleaning element will be mounted for rotation about a central axis parallel to the axis of the filter element, the two elements being so interconnected as to effect their concurrent rotation in the same direction. Both the surface portion of the filter element and also the external configuration of the cleaning element will generally be of cylindrical configuration, and the cleaning element will normally take the form of a brush. The filter will advantageously include a tubular element that extends through its chamber, and will have one end connected to the liquid intake conduit; the opposite will be closed, and will have at least one adjacent opening providing the sole location for liquid flow communication between the chamber and the intake conduit.

DETAILED DESCRIPTION OF THE ILLUSTRATED EMBODIMENTS

Figure 1:
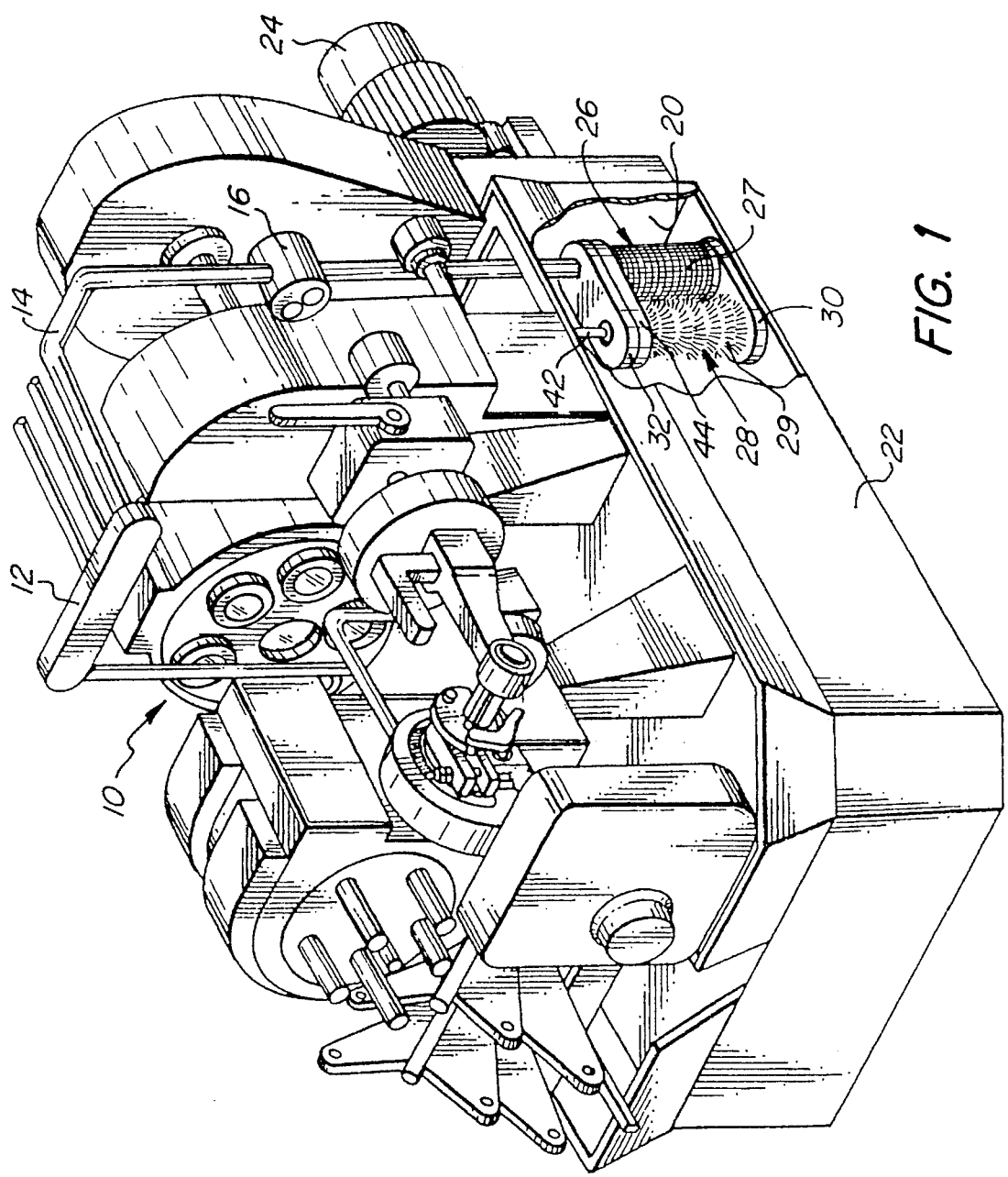
FIG. 1 is a perspective view of an automatic screw machine embodying the present invention, with a section broken away to expose components of the filter unit employed therein.

Turning initially to first two Figures of the drawings, the automatic screw machine of FIG. 1 includes mounting means, generally designated by the numeral 10, for mounting a plurality of tools at a machining location defined thereadjacent. The oil-delivery system of the machine includes a discharge manifold 12, to which is connected a delivery conduit 14 having a pump 16 installed therein. A well 20 in the base 22 of the machine defines an oil sump, and power is supplied by a motor 24.

A filter unit, connected to the conduit 14 and disposed in the well 20, includes a cylindrical filter component, generally designated by the numeral 26, and a cylindrical brush component generally designated by the numeral 28. The components 26, 28 are rotatably assembled side-by-side within a supporting piece 44, disposing the filter screen 27 of the component 26 in direct contact with the brush element 29 of the component 28. The assembly of components is in turn mounted within a base plate 30 and a cover plate 32, between which extend posts 34 and 36, post 34 being hollow and having a port 52 adjacent its closed lower end. The upper end of the post 34 is in liquid flow communication (established by means not illustrated) with the conduit 14, which passes through a hole 38 in the cover plate 32 into engagement with the threaded exit portion 46 of the filter component 26. The other post 36 is operatively connected (also by means not shown) at its upper end to a drive shaft 42, which in turn engages a threaded portion 48 at the top of the brush component 28. Toothed elements 50 are provided at the upper ends of both components 26, 28 and are adapted for interengagement (such as by a belt, not shown) to enable rotation of the two components concurrently and in the same direction.

As will be appreciated, the filter unit is submerged in the liquid "L" (e.g., oil) contained within the well 20. The liquid is withdrawn by action of the pump 16 during operation of the machine, flowing through the screen 27 and the port 52 into the hollow core of the post 34, and exiting through the conduit 14 for discharge upon tooling at the machining location 10.

During operation of the machine, power will be delivered from the motor 24 to the brush component 28, by way of a flexible drive shaft 42, effecting rotation of the component 28 and, in turn, of the filter component 26. The resultant mutual contact and relative rotation serves of course to cause the brush element 29 to effectively dislodge and eject foreign matter from the pores of the screen 26, thereby to prevent blockage and to ensure unabated flow of the lubricating liquid.

Figure 2:
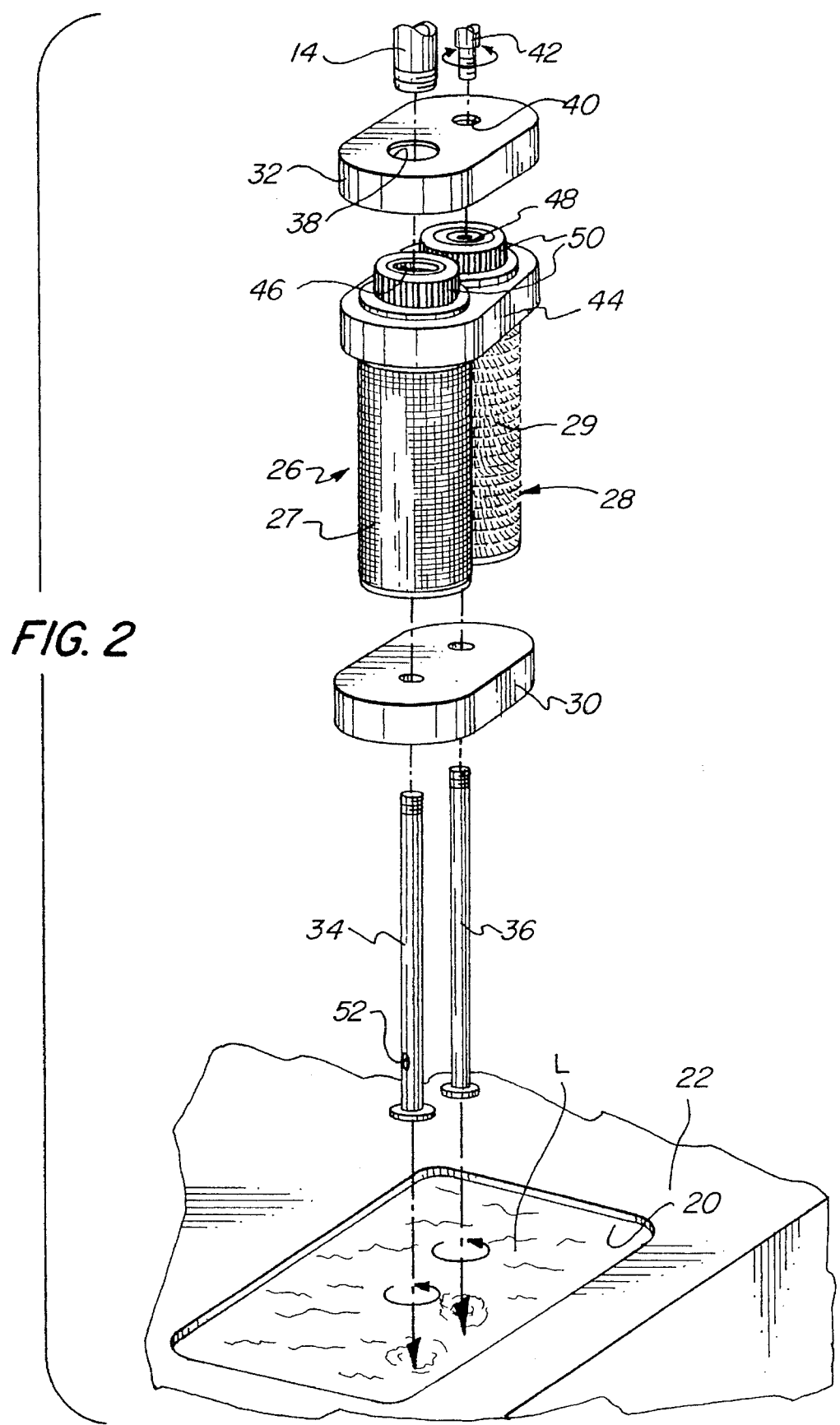
FIG. 2 is an exploded perspective view showing components of the filter unit utilized in the machine of FIG. 1.
Figure 3:
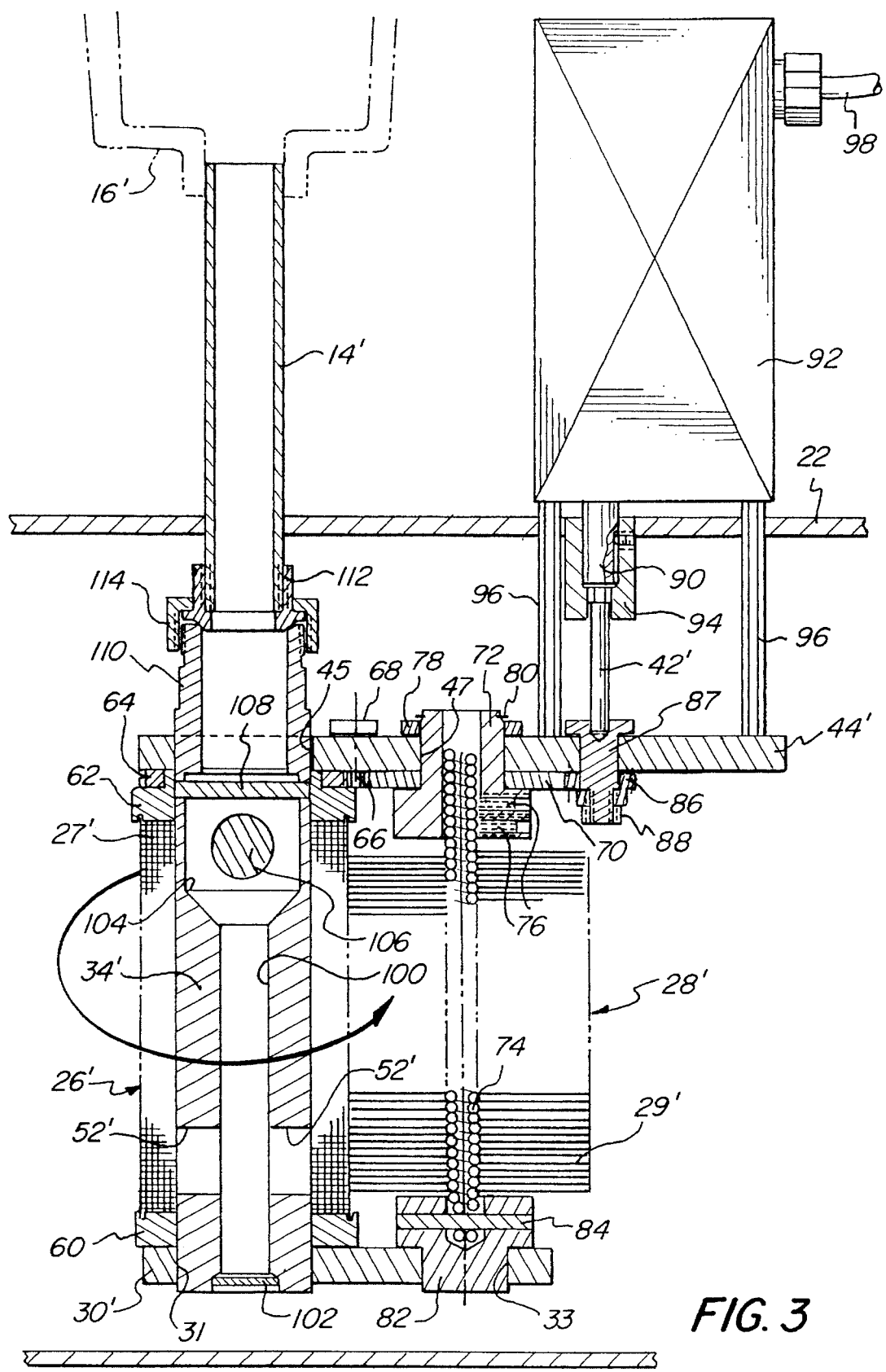
FIG. 3 is a sectional view showing a filter system suitable for use in the machine of the invention, utilizing a filter unit that is somewhat modified from that of the previous Figures.

Turning now to FIG. 3 of the drawings, depicted therein is a filter system embodying the present invention, the filter unit of which is somewhat modified from that of FIGS. 1 and 2. To the extent that components are common to all Figures the same numbers are employed, but they are modified by priming them in FIG. 3.

More particularly, the filter component 26' consists of a screen 27' having a resistance-welded vertical seam (not visible) thereon for axial reinforcement, the screen 27' being furnace brazed to annular supporting hubs 60 and 62 on the lower and upper ends, respectively. A ring gear element 64 is affixed (as by a soldering or brazing) to the upper hub 62 and is in meshing engagement with a pinion 66, the pinion being supported on the lower end of an idler shaft 68 which in turn extends through the support number 44'.

The brush element 29' comprises bristles held by a twisted wire core 74, the upper and lower ends of which are engaged, respectively, in journal bearings 72 and 82. The upper journal bearing 72 is seated in an aperture 47 of the support plate 44', and is held in place by a cooperating washer 78 and snap-ring fastener 80; set screws 76 extend radially through the bearing 72 to affix the upper end of the wire core 74 in place. The lower journal bearing 82 is similarly seated in an aperture 33 of a lower support plate 30'; it receives a diametrical pin 84, which passes through an aperture formed in the lower end of the core 74 to provide bottom support for the brush component 28'. A ring gear element 70 is affixed on the upper journal bearing 72, and serves to drive rotation of the brush component 28' as well as to transmit power through the pinion 66 and the gear element 64 to the filter component 26'.

A gear motor 92 is supported upon the support plate 44' by four legs 96 (only two of which are visible in FIG. 3). The shaft 90 is connected by a coupling 94 to the drive shaft 42', which is in turn attached at its lower end to a shoulder bolt 87 received through the plate 44'. A small ring gear element 86 is affixed on the shoulder bolt 87 beneath the plate 44', in meshing engagement with the gear element 70, and is maintained in assembly by a jam nut 88 engaged on the lower end of the bolt 87. Motor 92 is energized through power line 98, and would normally be activated automatically whenever the spindles of the screw machine are running; it of course obviates need for any connection of the filter unit to the motor 24.

Here again, the lubricating liquid "L" is drawn through the screen 27' under the influence of a pump 16' (only the housing of which is illustrated), passing into the bore 100 of the filter core 34' through its transverse ports 52'. Flow into the enlarged upper section 104 of the bore displaces the ball 106 (constituting the operative component of a check-valve mechanism), allowing passage through the nozzle portion 110 of the element 34' and thereafter into the connecting pipe 14'; components 112, 114 of a union threadably engage the lower end of the pipe 14' and the upper end of the nozzle portion 110, respectively.

Upon actuation of the motor 92, rotation of the components 26', 28' of the filter unit is effected concurrently and in the same direction. The bristles of the brush element 29' are thereby caused to sweep the surface of the filter screen 27', forcibly ejecting foreign matter and thereby cleaning the screen automatically and in a highly efficient manner.

Thus, it can be seen that the present invention provides an automatic screw machine having an incorporated unit for filtering coolant liquid, wherein rotation of the filter element relative to the cleaning element serves to dislodge foreign matter automatically and in an highly effective and efficient manner. The filter unit is itself novel, and is of relatively incomplex and inexpensive construction and manufacture.

Having thus described the invention, what is claimed is:

1. An automatic screw machine, comprising: mounting means for mounting a plurality of tools at a machining location; a sump disposed at a level below said machining location; a liquid delivery system including a pump and an intake conduit for conducting liquid from said sump to said machining location; and filter means including a filter element comprised of a screen having pores therein, a cleaning brush, support structure, and a core member, said filter element having a central axis, an internal chamber, and an outside surface portion on said screen of circular configuration extending circumferentially and in the direction of said central axis, and being mounted by said support structure for rotation about said central axis, said cleaning brush being configured for sweeping said screen outside surface portion and being mounted by said support structure in direct contact with said surface portion; said intake conduit of said liquid delivery system being operatively connected to said chamber of said filter element for the withdrawal of liquid passing thereinto, and said filter element being operatively disposed in said sump for suffusion by liquid contained therein; said core member being disposed in said chamber of said filter element and having an end portion connected to said intake conduit and a passage therein open to said chamber and said conduit for establishing flow communication therebetween, said core member also including a check valve mechanism allowing passage of liquid, from said filter element chamber to said intake conduit; said machine additionally including drive means operatively connected for effecting rotation of said filter element, whereby said surface portion of said screen may automatically be cleaned by rotation against said cleaning brush.

2. The machine of claim 1 wherein said cleaning brush is of circular external configuration and is mounted for rotation about a central axis parallel to said central axis of said filter element, and wherein said drive means is so connected as to effect rotation of said cleaning concurrently with said filter element and in the same direction.

3. The machine of claim 2 wherein said surface portion of said filter element and said cleaning brush are both of cylindrical form.

4. The machine of claim 1 wherein said core member extends through said chamber of said filter element and has opposite ends with said passage therebetween, one of said ends of said core member being closed and the other of said ends having said end portion thereat, said core member having at least one opening adjacent said one end providing the sole location for liquid flow communication between said chamber and said passage.

5. The machine of claim 1 wherein said drive means includes a motor associated directly with said filter means.

6. The machine of claim 1 wherein said core member has a cavity therein communicating with said passage and defined in part by a seating surface at the intersection with said passage, and a valve element disposed within said cavity for seating upon, and displacement from, said seating surface, said valve element and said seating surface comprising said check-valve mechanism.

\* \* \* \* \*

UNITED STATES PATENT AND TRADEMARK OFFICE
CERTIFICATE OF CORRECTION

PATENT NO. : 5,514,265
DATED : May 7, 1996
INVENTOR(S) : Gary F. Nowak and Glen L. Nowak It is certified that error appears in the above-identified patent and that said Letters Patent is hereby corrected as shown below:

Claim 2, column 4, line 38, insert after "cleaning" the word --brush--.

Signed and Sealed this

Thirteenth Day of August, 1996

Attest:

BRUCE LEHMAN

*Attesting Officer*  *Commissioner of Patents and Trademarks*